United States Patent [19]
Konno et al.

[11] Patent Number: 5,552,654
[45] Date of Patent: Sep. 3, 1996

[54] ELECTROSTATIC ACTUATOR

[75] Inventors: Shinji Konno; Takashi Fukuyama; Masahiro Yamamoto, all of Yokohama, Japan

[73] Assignee: Mitsubishi Chemical Corporation, Tokyo, Japan

[21] Appl. No.: 327,415

[22] Filed: Oct. 21, 1994

[30] Foreign Application Priority Data

Oct. 21, 1993 [JP] Japan ..................... 5-263764

[51] Int. Cl.$^6$ ................................ H02N 1/00
[52] U.S. Cl. ................. 310/309; 310/12; 310/176
[58] Field of Search ............................ 310/309, 176, 310/45, 12, 308, 40 MM, 68 D; 363/22, 24; 313/309

[56] References Cited

U.S. PATENT DOCUMENTS

| | | | |
|---|---|---|---|
| 3,729,925 | 5/1973 | Emerson | 310/309 |
| 4,675,796 | 6/1987 | Gautherin | 363/24 |
| 5,235,225 | 8/1993 | Colgate | 310/12 |
| 5,239,222 | 8/1993 | Higuchi | 310/309 |
| 5,448,124 | 9/1995 | Higuchi | 310/309 |

FOREIGN PATENT DOCUMENTS 2-285978   11/1990   Japan .

OTHER PUBLICATIONS

Electrostatic Actuator; No. 6/191; (No Month) 1989; The Institute of Electrical Engineers of Japan.
Articles of Rotating Machine Society; Nov. 1991; The Institute of Electrical Engineer of Japan.

*Primary Examiner*—R. Skudy
*Attorney, Agent, or Firm*—Oblon, Spivak, McClelland, Maier, & Neustadt, P.C.

[57] ABSTRACT

An electrostatic actuator includes a stationary element having a plurality of driving electrodes arranged in a predetermined direction and with predetermined spaces in an isolated state on an insulating supporter, a movable element, disposed in contact with the stationary element, electric wires connected to the driving electrodes of the stationary element, and a driving voltage control section to apply to the driving electrodes voltages which cause a change in the relative position of the first and second members by a Coulomb's force of static electricity between the stationary element and the movable element, which is produced by switching the voltages to the driving electrodes, wherein the driving voltage control section includes a power source of high voltage and direct current, a high voltage switching portion and a driving control portion; the power source including a transformer for raising the voltage of high frequency current signals, and a rectifier for rectifying an output of the transformer to obtain high positive and negative voltages of direct current.

21 Claims, 6 Drawing Sheets

ELECTROSTATIC ACTUATOR

BACKGROUND OF THE INVENTION

1. Field of the Invention

The present invention relates to an electrostatic actuator.

2. Discussion of Background

An electrostatic actuator is mainly composed of a stationary element formed by arranging electrodes with a predetermined distance on an insulating supporter and a movable element formed by disposing a resistance layer on an insulating sheet such as an insulating film wherein the stationary element and the movable element are in contact with each other. The electrostatic actuator is adapted to instantaneously raise the movable element by the function of static electricity and move the movable element without any frictional force (vide, a proceeding number 6/191 in national session of 1989's The Institute of Electrical Engineers of Japan, and Japanese Unexamined Patent Publication No. 285978/1990).

The electrostatic actuator has such features that a density of force can be increased by reducing the dimensions of the electrodes and electrode gap, and the size can be made small. Accordingly, the electrostatic actuator is expected to be used as a small-sized driving device such as a paper transferring mechanism for a word processor, a facsimile machine or the like and a driving device for another small mechanical system.

FIGS. 7a through 7d are diagrams showing the principle of operation of a conventional electrostatic actuator (an electrostatic film actuator) in which a movable element comprises an insulating film. In the Figures, reference numeral 1 designates an insulating supporter, numeral 2 designates strip electrodes, numeral 3 designates a stationary element, numeral 4 designates an insulating film, numeral 5 designates a resistance layer, numeral 6 designates a movable element and numerals 7, 8 and 9 designate electric wires.

In operation, first, a positive voltage and a negative voltage are applied to wires 7 and 8 respectively as shown in FIG. 7a. Then, a current flows in the resistance layer 5 due to a potential difference between electric charges ① at the electrode connected to the wire 7 and electric charges ② at the electrode connected to the wire 8. The electric charges are induced at the boundary of the insulating film 4 and the resistance layer 5 of the movable element 6 to reach an equilibrium state. For convenience of explanation, the induced electric charges are represented by electric charges ③ and ④ having opposite polarities shown by dotted lines in FIG. 7b. In the state shown in FIG. 7b, since the polarities of the electric charges ③ and ④ are respectively different from the polarities of the electric charges ① and ②, the movable element 6 is attracted to the stationary element 3.

Then, a negative voltage is applied to the wire 7, a positive voltage is applied to the wire 8 and a negative voltage is applied to the wire 9 as shown in FIG. 7c. Then, the electric charges at the electrodes can be instantaneously changed, however, the electric charges having the opposite polarities in the movable element 6 can not be immediately moved because the resistivity in the resistance layer 5 is high. As a result, a repulsive force takes place between the movable element 6 and the stationary element 3. The repulsive force reduces friction between the stationary element 3 and the movable element 6, and a driving force in the right direction in the Figure is produced due to the negative electric charges ⑤ and the induced electric charges ④ (in terms of the electric charges having the opposite polarity) as a result of the application of the negative voltage to the wire 9.

FIG. 7d shows a state that the movable element 6 is shifted in the right direction by one pitch of electrode by the driving force. When the movable element 6 is to be moved in the left direction, a positive voltage is applied to the wire 9.

In a voltage application pattern (FIG. 7c) in the operations to move the electrodes by one pitch, voltages having opposite signs with respect to the state shown in FIG. 7a are applied to the wires 7 and 8. Therefore, the induced electric charges (③ and ④ in terms of the electric charges having opposite polarities) attenuate.

Accordingly, in order to successively move the movable element 6 in the right direction by one pitch of electrode, it is necessary to repeatedly apply the voltage pattern, as indicated below, i.e., it repeats a charging operation of electric charges and a moving operation. The voltage pattern, described below, shows a voltage pattern for one cycle wherein a symbol G represents a non-voltage application state (an earthing state), a sign (+) represents a state of applying a positive voltage, and a sign (−) represents a state of applying a negative voltage. Characters C and A represent the charging operation and the moving operation respectively, a character C1 represents the state shown in FIG. 7a, and a character A1 at the first represents the state shown in FIG. 7c.

|  | C1 | A1 | C2 | A2 | C3 | A3 | (one cycle) |
|---|---|---|---|---|---|---|---|
| Wire (7) | + | − | G | − | − | + |  |
| Wire (8) | − | + | + | − | G | − |  |
| Wire (9) | G | − | − | + | + | − |  |

When an arrangement of electrodes of a three phase structure is used, for instance, the pattern for driving voltage may be selected from various types of voltage pattern as far as they cause the charging operation and the moving operation repeatedly in which the earthing state is provided at a suitable timing. For instance, a voltage pattern in which C1 and C2 are omitted can be used.

In order to successively move the movable element in a stable manner for every one pitch of electrode, it is said that the surface resistivity of the movable element 6 (or the resistance layer 5) be in a range of $10^{11}$–$10^{15}$ $\Omega/\square$. The reason is as follows.

When the surface resistivity of the movable element 6 is too high, it takes relatively long time for charging electricity. On the other hand, when it is too low, electric charges attenuate instantaneously, so that it is difficult to successively move the movable element in a stable manner.

In the electrostatic actuator shown in FIG. 7, the resistivity of the insulating film 4 forming the movable element is too high. Accordingly, it is necessary that the resistance layer is formed on the insulating film so that the resistance layer has a slight electric conductivity by the reason as described above. Further, in place of the insulating film 4, another insulating sheet having the same resistivity may be used.

At present, the electrostatic actuator has been in study, and the various structural elements have to be examined in detail in order to render the actuator to be practical use. In particular, since the stationary element and the movable element of the electrostatic actuator are formed of a sheet-like body, it is easy to reduce the size and the thickness.

However, it is necessary to reduce the size and the thickness of a driving device for moving the movable element in order to use the electrostatic actuator practically.

Further, cost of the driving device should be reduced in order to accelerate the practical use of commodities to which the electrostatic actuator is applied. Although some published documents describe the study of the principle of driving the electrostatic actuator and a certain achievement, they fail to disclose the study of reducing the cost.

In particular, since a high voltage such as more than 100 V has to be used as a driving voltage for the electrostatic actuator, cost for a high voltage power source of direct current and a high voltage switching circuit is pushed up, and therefore, it is expected to reduce the cost of these parts.

On the other hand, the study of reducing the magnitude of driving voltage is made to reducing the cost. For instance, if the distance between the electrodes of the stationary element can be reduced to several tens μm, the driving voltage can be reduced. However, the idea is not practical at the present stage since there is a demand of increasing the surface area of the electrostatic actuator.

In "Articles of Rotating Machine Society" (published by The Institute of Electrical Engineers of Japan on Nov. 15, 1991), use of a piezoelectric transformer as a high voltage power source for the electrostatic actuator is proposed. However, the piezoelectric transformer suffers restriction in practical use since the output current is extremely small as described in comparative example described before.

The inventors of this application have made intensive study in view of the above-mentioned situation, and have obtained the knowledge as follows.

The electrostatic actuator can be driven by repeating charging and discharging operations to a load having a relatively small capacitance such as about 100 pF–10 nF. Although a high voltage is necessary for moving the movable element, an amount of electric current can be small as several mA or lower. Further, the durability of the electrodes on the stationary element is improved by reducing the amount of electric current from a high voltage power source of direct current.

The equivalent circuit per unit of the electrostatic actuator can be expressed by the capacitance C and the resistance R formed by the stationary element and the movable element. A symbol R1 indicates the resistivity of the movable element, and the surface resistivity is generally in a range of $10^{11}$–$10^{15}$ Ω/□ as described before. A symbol R2 indicates the resistivity of an insulating material for forming an insulating layer on the surface of the electrodes in order to improve an insulation property between the electrodes.

An electrostatic energy for driving the movable element is expressed by the product of the square of the capacitance C and an applied voltage, and an electric current flowing in the insulating material having a resistance R2 between the electrodes becomes loss. When the electrostatic actuator is driven in the state shown in FIG. 7, a substantial amount of current flows in the insulating material having a resistance R2 between the electrodes. Accordingly, the loss of electric current can be reduced by selecting material having a large volume resistivity such as $10^{11}$ Ω cm or higher. Further, it is possible to minimize a consumption current to drive the electrostatic actuator.

On the other hand, when the insulating material between the electrodes is moisturized or pin holes takes place in it whereby the insulation strength decreases, a minute electric discharge may happen between the electrodes.

Further, when the capacity of electric current of the high voltage power source of direct current is large, electric discharge may gradually spread to thereby cause breakage of the electrodes. Accordingly, when the capacity of electric current of the high voltage power source of direct current is made small to an extent of capable of driving the electrostatic actuator, the size of the high voltage power source can be small, and at the same time, the spreading of electric discharge can be prevented, whereby the durability of the electrodes can be improved.

SUMMARY OF THE INVENTION

It is a first object of the present invention to provide an electrostatic actuator which comprises:

a first member having a plurality of driving electrodes arranged in a predetermined direction and with predetermined spaces in an isolated state on an insulating supporter, a second member, disposed in contact with the first member, which is provided with means for supplying positive and negative electric charges to an insulating sheet, and a driving voltage control section to apply to the electrodes voltages which cause a change of the relative position of the first and second members by the Coulomb's force of static electricity between the first and second members, which is produced by switching the voltages to the driving electrodes, wherein the driving voltage control section comprises a high voltage power source of direct current, a high voltage switching portion and a driving control portion; voltages in the high voltage power source of direct current are raised by high frequency signals from a transformer, and the raised voltages are rectified to obtain high positive and negative voltages of direct current.

It is a second object of the present invention to provide an electrostatic actuator which comprises:

a first member having a plurality of driving electrodes arranged in a predetermined direction and with predetermined spaces in an isolated state on an insulating supporter, a second member, disposed in contact with the first member, which is provided with means for supplying positive and negative electric charges to an insulating sheet, and a driving voltage control section to apply to the electrodes voltages which cause a change of the relative position of the first and second members by the Coulomb's force of static electricity between the first and second members, which is produced by switching the voltages to the driving electrodes, wherein the driving voltage control section comprises a high voltage power source of direct current and a driving control portion, and a high voltage pattern of direct current is produced by passing driving control signals from the driving control portion through at least one voltage-raising-rectifying circuit in the high voltage power source of direct current.

In the electrostatic actuator according to the first object, a high frequency-low loss magnetic material such as ferrite is used for the core of a transformer. In the electrostatic actuator of the present invention, since an amount of electric current to be used is small, the transformer can be formed with a wiring having a diameter of several 10 μm, and by rectifying and smoothing a voltage boosted by the transformer, the size and the thickness of a high voltage power source of direct current can be reduced. Further, in a driving pattern to be applied to the electrodes for driving the movable element, the amount of electric current used can be small, and accordingly, when a small-sized power element is used, the size of a high voltage switching portion can be reduced.

In the electrostatic actuator of the second object, driving control signals produced from a driving control portion are processed in at least one voltage-raising-rectifying circuit in the high voltage power source of direct current to thereby obtain a high voltage pattern of direct current. Accordingly, since a low voltage type element can be used as a switching element for the driving control portion, a commercially available switching element of low price can be utilized.

In accordance with the present invention, the size and the thickness of the driving device for the electrostatic actuator can be reduced and it is very useful in practical use.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
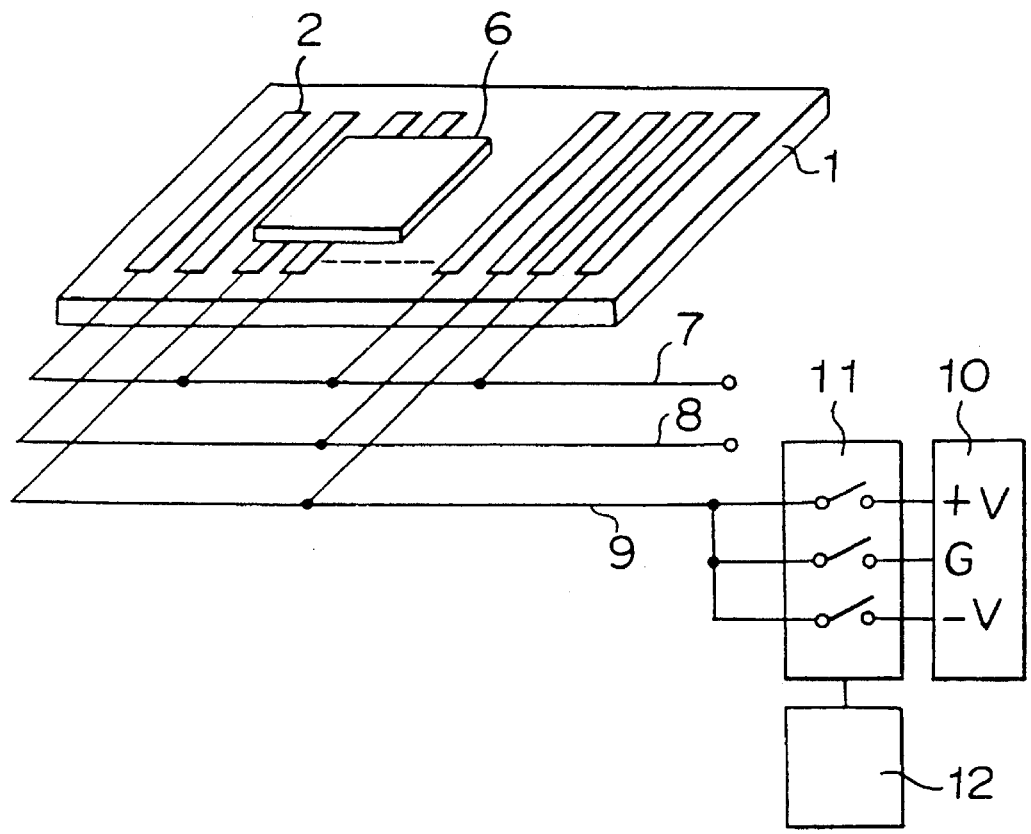
FIG. 1 is a schematic view of an electrostatic actuator manufactured in accordance with Example 1 of the present invention.
Figure 2:
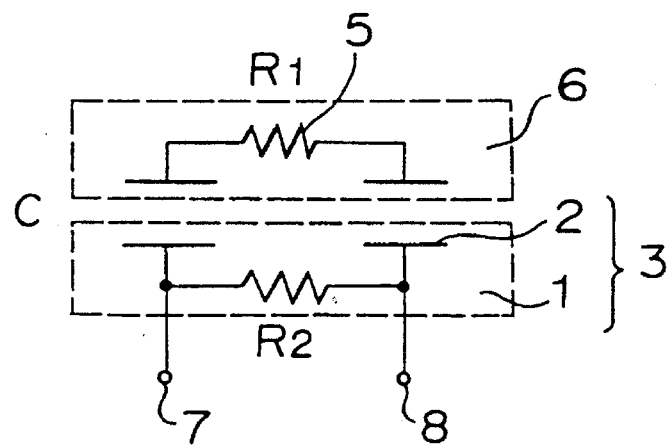
FIG. 2 is a diagram showing an equivalent circuit per unit of the electrostatic actuator.

Preferred embodiments of the electrostatic actuator of the present invention will be described in detail with reference to the drawings.

In FIGS. 1 through 8, reference numeral 1 designates an insulating supporter, numeral 2 designates a plurality of strip electrodes, numeral 3 designates a stationary element, numeral 4 an insulating sheet, numeral 5 a resistance layer, numeral 6 a movable element, numerals 7 through 9 designate electric wires, numeral 10 designates a high voltage power source of direct current, numeral 11 designates a high voltage switching portion, numerals 12, 16 and 17 designate driving control portions, numeral 13 designates an inverter portion, numeral 14 a transformer portion, numeral 15 a rectifying circuit portion, symbols Q1, Q2 and Q5 through Q8 designate switching transistors, symbols Q3, Q4, Q5 and Q10 diodes, symbol T1 designates a core of transformer, symbols N1 and N2 designate primary windings of transformer, symbols C1 through C13 capacitors and symbols R1–R6 resistors respectively.

Now, the present invention will be described in further detail with reference to Examples.

However, it should be understood that the present invention is by no means restricted to such specific Examples.

EXAMPLE 1

On the insulating supporter 1, the strip electrodes 2 were formed to have a three phase structure with a pitch of 400 μm to thereby form the stationary element 3. On the stationary element 3, the movable element 6 formed by coating the resistance layer 5 on the insulating sheet 4 was placed. The driving voltage control section for driving the movable element was constituted by the high voltage power source of direct current 10, the high voltage switching portion 11 and the driving control portion 12 for controlling switching of driving voltage.

Figure 3:
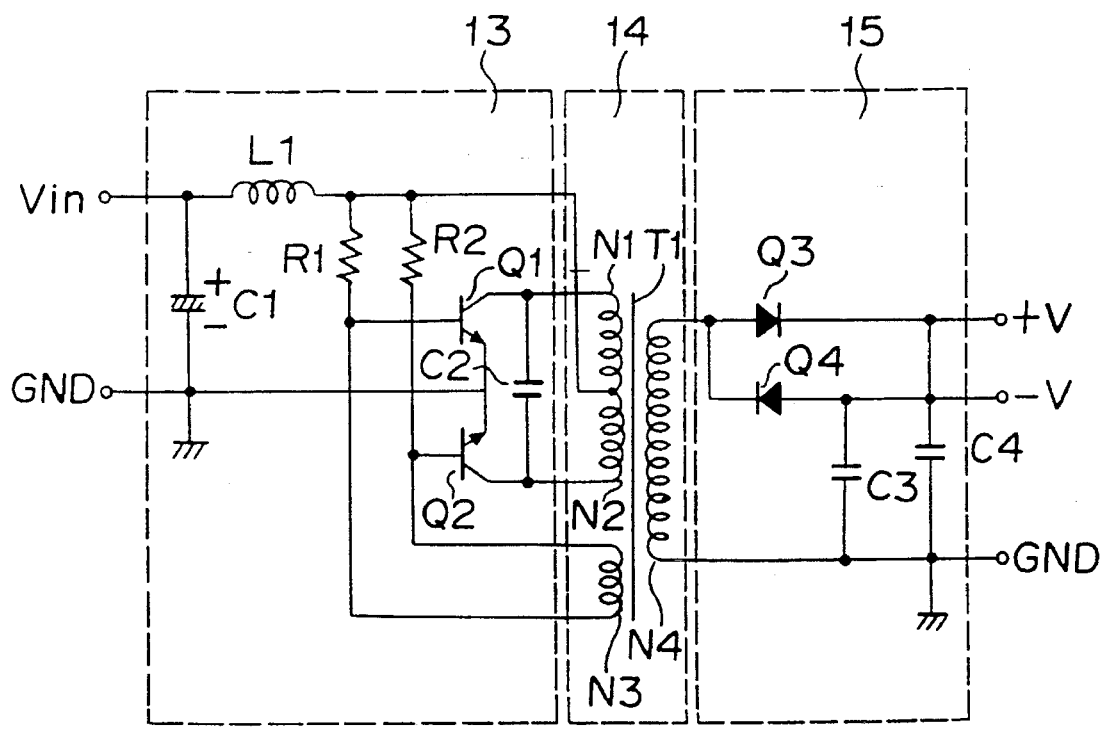
FIG. 3 is a circuit diagram showing an embodiment of a high voltage power source of direct current used in the present invention.

The high voltage power source of direct current 10 will be described with reference to FIG. 3. The high voltage power source of direct current 10 is composed of the inverter portion 13 for forming a high frequency signal by switching a DC input supplied from a dry cell or the like by the switching transistors Q1 and Q2, the transformer portion 14 for forming either state of insulation or voltage increase by changing the proportion of the primary windings N1 and N2 and the secondary winding N4 of the transcore T1, and the rectifier circuit portion 15 which rectifies a high frequency-high voltage signal isolated or raised in pressure in the transformer by means of the diodes Q3 and Q4; smooths the rectified output signal by smoothing capacitors C3 and C4 whereby stable positive, negative and GND direct currents can be formed. Further, a voltage doubling-rectifying circuit such as a Cockcroft-Walton circuit may be used as the rectifying circuit.

A particularly important element for reducing the size and the thickness of the high voltage power source of direct current used in the present invention is the transformer portion. Since a consumption current in the electrostatic actuator is extremely small as several mA or lower, the diameter of the coil winding of the transformer can be reduced to 50–100 μm. Further, when an oscillation frequency is larger, the size of the transformer can be made small. Accordingly, a soft magnetic material for providing a small hysterisis and a small eddy current loss even under high frequency, for instance, ferrite can be used for material for the core of the transformer. The oscillating frequency of the inverter portion is generally 10 kHz–1 MHz. However, the frequency can be suitably selected in correspondence to the characteristics of the transformer which are determined by the material for the core, the coil and so on.

A capacitor having a large capacitance is used in the output portion of the rectifying circuit portion. However, the magnitude of capacitance is in inverse proportion to a switching frequency, and accordingly, the magnitude of the capacitor can be reduced by increasing the oscillating frequency.

Since the transformer portion produces high voltage and high frequency, it is important that it should be safe even through it is small. Accordingly, it is necessary to assure safety in insulation. For this purpose, the maximum voltage and the distribution of capacitance for one coil should be reduced by utilizing a splitted winding structure. Further, it is possible to increase the stability of output voltage by using a regulator or the like.

A voltage raising ratio by the transformer is desirally in a range of 5–500 times.

For a method of mounting the transformer portion on a substrate, use of a terminal type or a surface mounting type mounting method is advantageous in order to obtain a thin and low shape.

For the method of obtaining positive and negative D.C. high voltages by rectifying and smoothing a high voltage current of high frequency in the transformer, there is a method of using two line systems each comprising the inverter 13, the transformer 14 and the rectifying circuit 15, or a method of using a single line system comprising the inverter and the transformer in addition to two line systems each comprising the rectifying circuit. However, the selection may be made in view of requisite specifications such as the stability of power source and so on. Further, in order to miniaturize the electrostatic actuator, use of round type inverter and transformer is effective.

The high voltage switching portion 11 will be described.

Figure 4:
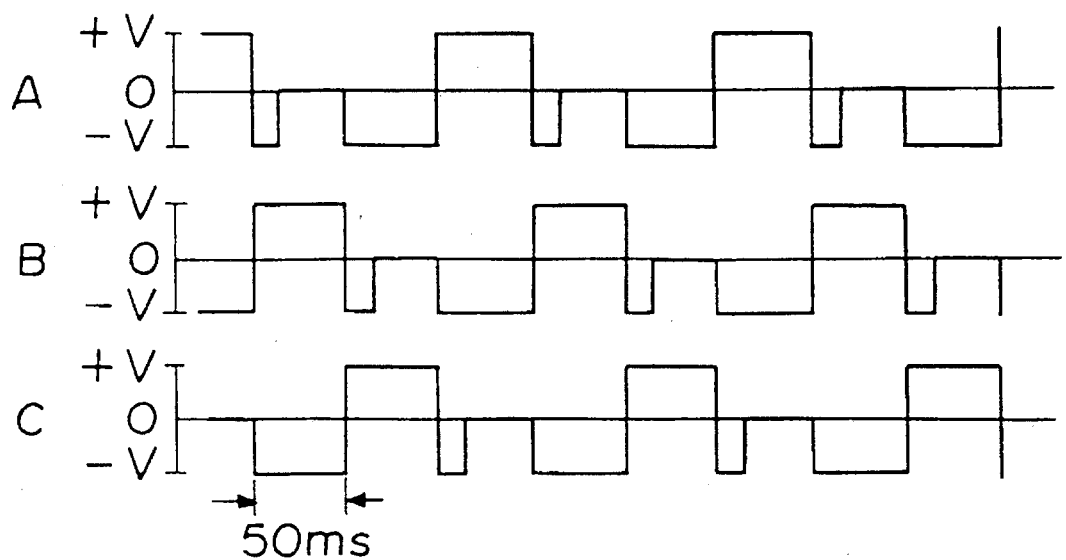
FIG. 4 is a diagram showing an example of a driving voltage pattern for moving the movable element of the electrostatic actuator in one direction, in accordance with the present invention.

As shown in FIG. 1, the electric wires 7, 8 and 9 connected to the electrodes of the stationary element are connected to the high voltage power source of direct current through the high voltage switching portion 11 comprising relays and contacts. The high voltage switching portion 11 selectively applies high voltage signals of +V, G and −V to the electric wires connected to the electrodes of the stationary element so as to move the movable element by switching the driving control portion 12. An example of the driving voltage pattern to move the movable element in one direction according to the present invention, is shown in FIG. 4.

In the conventional technique, a mechanical contact type relay, a mercury relay or the like was used as an element for the high voltage switching portion. On the other hand, since the amount of electric current to be used in the electrostatic actuator of the present invention is small, a small-sized power element such as a photo-mos relay, FET, triac or the like can be used. Accordingly, a small-sized electrostatic actuator is obtainable.

Explanation will be made as to the stationary element 3.

As shown in FIG. 1, the stationary element 3 was formed by disposing the strip electrodes for three phases on the insulating supporter 1. In FIG. 1, two phases of electric wires are extended on the front surface and the remaining one phase of electric wire is extended on the back surface by using a through-hole method wherein a hole is formed at the center of a land formed at an edge portion of the electrodes. The method of extending the electric wires may be according to another known method.

The insulating supporter 1 is normally formed of a film or a sheet made of an insulating material. The insulating material is not particularly limited, and it may be a synthetic resin having excellent insulating property such as ceramics, glass or the like. As examples of insulating resin, there are epoxy resin, polyimide resin, polyester resin, polypropylene resin, polyvinylidene chloride resin, polystyrene resin, polyamide resin, polyvinyl chloride resin, polyethylene resin, polycarbonate resin, polyvinyl alcohol type resin and so on. Among them, preferable insulating resin are polyimide resin and polyester resin.

The electrodes disposed on the insulating supporter 1 are generally provided on a surface of the insulating supporter 1. However, they may be embedded in the insulating supporter 1. In particular, a preferred method to improve the insulation property between the electrodes is to form an insulation layer on the front surface of the electrodes and to put the electrodes between the insulating supporter 1 and the insulating layer.

As a method of embedding the electrodes, there are a method of applying synthetic resin having a high insulating property on the electrodes disposed on the insulating supporter 1 or a method of laminating an insulating synthetic resin film (a cover film) or a film with a viscous agent which has a high insulating property. Further, a combination of these methods may be used. In particular, it is preferable to select an insulating material having a volume resistivity of $10^{11}$ Ω cm or higher so as to minimize an amount of electric current to the electrodes of the stationary element as described before.

In the present invention, the strip electrodes are generally used. Although the distance between the strip electrodes 2 is not particularly limited, it is desirable to determine the distance between the strip electrodes to be small such as 0.1–2 mm so that driving performance such as driving voltage to the electrostatic actuator can be improved.

Further, the shape of the electrodes can be selected from various shapes instead of the strip form, for instance, dot-type electrodes may be used.

Although the method of forming the electrodes is not particularly limited, a method of printing known silver ink or transparent electric-conductive particles with use of a gravure printing technique or a screen printing technique or a method of forming a thin film of copper or Indium Tin Oxide (ITO) followed by etching, can be used.

In the next, explanation will be made as to the movable element 6.

The insulating sheet 4 for forming the movable element 6 is composed of a film or a sheet of the same synthetic resin as the insulating resin which constitutes the stationary element 3. However, it may be glass or ceramics having the same resistance as the synthetic resin. When the insulating sheet 4 is a synthetic resin film, use of a polyester film, particularly a polyethylene-terephthalate film is preferred from the viewpoints of density, bendability, crease resistance and so on.

As a method of applying positive and negative electric charges to the insulating sheet 4 which constitutes the movable element, there is a method of forming the resistance layer 5 on the insulating sheet 4 in the same manner as the method of forming the conventional electrostatic film actuator shown in FIG. 7. Specifically, there is a method of coating an antistatic agent on the front surface of the insulating sheet 4, for instance. In this case, it is desirable that the surface resistivity of the resistance layer 5 is in a range of $10^{11}$–$10^{15}$ Ω/□, preferably about $10^{14}$ Ω/□. The resistance layer may be formed on either the surface of the insulating sheet 4, which is in contact with the stationary element 3 or the other surface. However, it is preferable to form the resistance layer 5 on the surface without contacting with the stationary element 3.

The method of applying the positive and negative electric charges to the insulating sheet 4 is not limited to the above-mentioned method, and another method known to a person in this art may be used. For instance, when the insulating sheet 4 is formed of a synthetic resin film, the insulating sheet 4 in which an electric conductive material such as carbon black or the like can be used as a resistance material having the same resistance as the above-mentioned insulating sheet. Further, there are a method of forming strip electrodes on the insulating sheet 4, a method of utilizing an ion generating device, a method of using electret material for the insulating sheet 4 and so on.

The thickness of the insulating sheet 4 can not primarily be determined since power produced by the electrostatic actuator depends on how to apply electric charges to the insulating sheet. Generally, the thickness is preferably 10 μm or more. Further, it is preferable to determine the thickness of the insulating sheet 4 to satisfy a relation of 0.05<G/P<0.4 where the distance between the strip electrodes 2 arranged on the insulating supporter 1 is P and the length between the front surface of the strip electrodes 2 and the boundary surface of the insulating sheet 4 and the resistance layer 5 is G.

When both surfaces of the insulating supporter and the insulating sheet which form the stationary element and the movable element are smooth, there may occur a problem that the movable element can not smoothly be moved because air can not sufficiently enter between the stationary element and the movable element, and the stationary element and the movable element attract to each other due to the presence of an extremely thin water layer between the contacting surfaces, whereby there is a friction between them. When electric charges are applied to the electrostatic actuator, the movable element is attracted to the stationary element, so that there is a vary large frictional force between the stationary element and the movable element.

In order to eliminate the problem, it is preferable to form an uneven pattern or projections of a height of in 2–50 μm and a density of 1–100,000 number/cm$^2$ in at least one of the contacting surfaces of the stationary element and the movable element.

Further, a lubrication layer may be provided on at least one of the contacting surfaces of the stationary element and the movable element. As the lubrication layer, a solid lubricating agent, a liquid lubricating agent or another known material may be used. In this example, a liquid lubrication layer of 3 nm thick was formed by applying perfluoropolyether (tradename "AM2001" by Nippon Montedison K.K.) on the stationary element.

In the electrostatic actuator shown in FIG. 1, the size of the stationary element 3 on which the strip electrodes 2 are arranged with a pitch of 400 μm in a three phase structure on a PET film of a thickness of 125 μm is 20 cm×30 cm, and the size of the moving element 6 formed by applying the resistance layer on a PET film of a thickness of 25 μm is 10 cm×10 cm. On the surface of the electrodes of the stationary element, a polyester type thermosetting resin of $10^{12}$ Ω cm (water absorbing coefficient: 0.5%, Tg: 47%) was formed by screen printing. In this case, the capacitance between the electrodes was about 1,000 pF. The high voltage power source of direct current was prepared in accordance with the circuit shown in FIG. 3. The main specifications are as follows.
Winding ratio of transformer: 108 times
Oscillation frequency: 63.9 kHz
Input voltage: 4.5 V
Output voltage: ±600 V A photo-mos relay (AQV259 by Matsushita Electric Works) was used for the switching portion, and a commercially available IC was used for the driving control portion to produce driving control pulses.

The entire size of the high voltage power source of direct current, the switching portion and the driving control portion was 5 cm (longitudinal side)×8 cm (lateral side)×2 cm (thickness). Thus, a very small driving voltage control section suitable for the electrostatic actuator could be manufactured.

When the electrostatic actuator was driven by an input voltage of DC4.5 V and 20 Hz (8 mm/s) with use of a dry cell, it was observed that the movable element was successively driven. In this case, the current flowing in the electrodes of the stationary element was about 0.1 mA. The size of the driving voltage control section can be further reduced if the method of mounting is improved or ASIC is used.

Further, for the driving voltage control section it is preferable to mount structural elements on a substrate, and cover the structural elements with an insulating resin.

EXAMPLE 2

Figure 5:
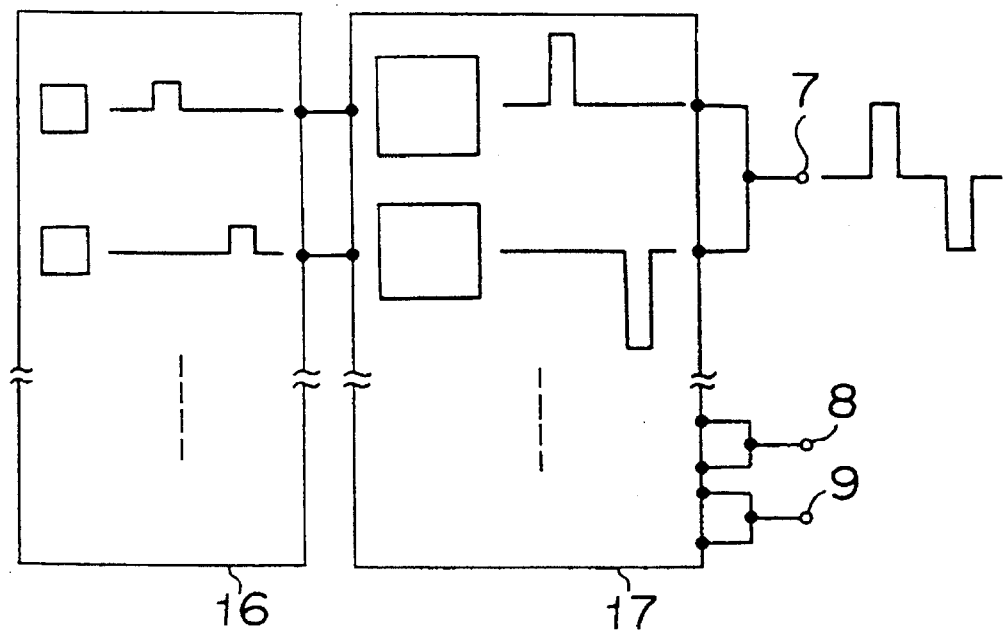
FIG. 5 is a schematic view of a driving voltage control section for an electrostatic actuator manufactured in accordance with Example 2.

In the electrostatic actuator having a driving circuit shown in FIG. 5, the driving voltage control section for driving the movable element comprises a driving control portion 16 for low voltage switching and a high voltage power source of direct current 17 which increases, rectifies and smoothes driving control signals outputted from the driving control portion 16 so as to form high voltage signals.

The driving control portion 16 produces driving control signals of low voltage of a transistor level.

The high voltage power source of direct current 17 raises, rectifies and smoothes the driving control signals of low voltage and changes the signals into high voltage patterns of +V, G and −V to be applied to the electrostatic actuator. In order to raise the voltage, it is effective to use the transformer as used in Example 1.

Since the high voltage patterns of +V, G and −V applied to the electric wires 7, 8 and 9 for the electrodes of the stationary element of the electrostatic actuator in FIG. 5 are obtained by raising, rectifying and smoothing the low voltage control signals generated from the driving control portion, the number of the high voltage power source of direct current in the transformer is 6 in total. By utilizing the structure shown in FIG. 5, the high voltage switching device becomes unnecessary unlike the structure of Example 1. Accordingly, the driving voltage control section can be simplified.

EXAMPLE 3

Figure 6:
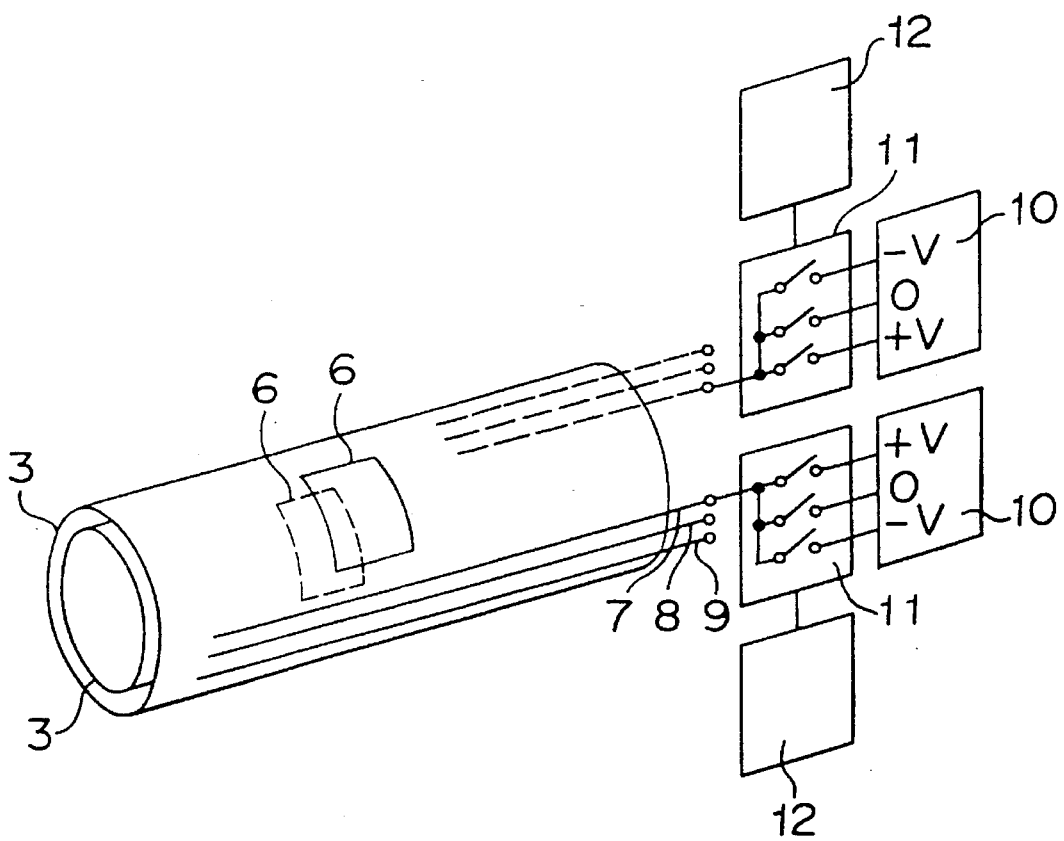
FIG. 6 is a schematic view of an electrostatic actuator manufactured in accordance with Example 3.
Figure 7A:
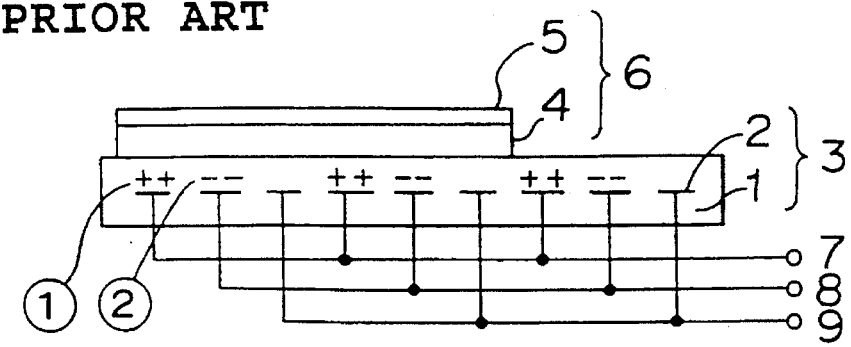
FIGS. 7(a)–(d) show a diagram showing the principle of operation of a conventional electrostatic actuator.
Figure 7B:
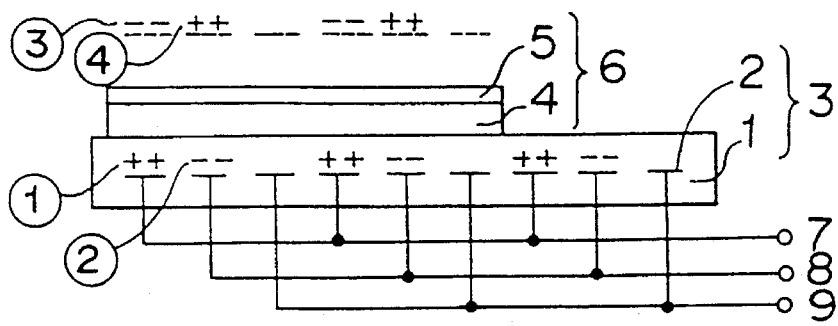
Figure 7C:
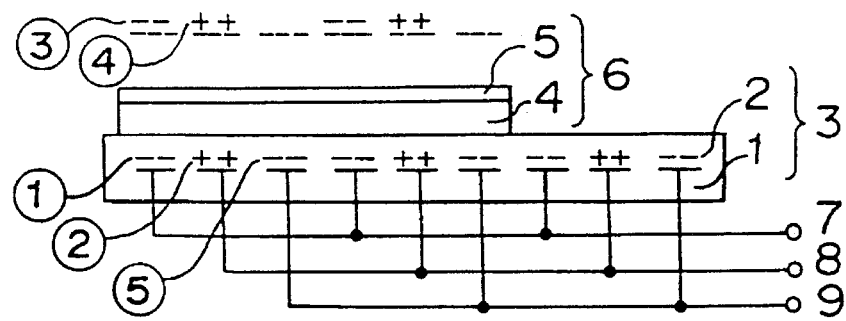
Figure 7D:
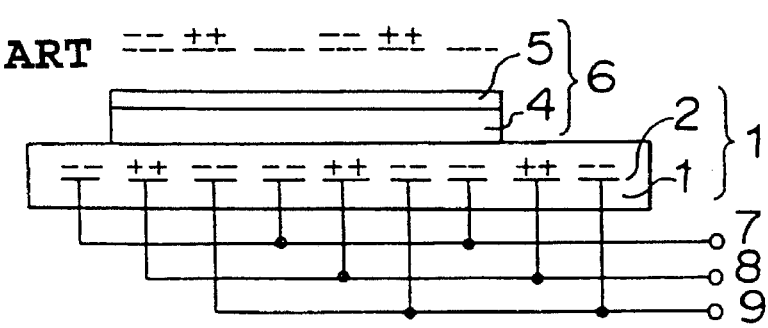

In the electrostatic actuator shown in FIG. 6, the stationary element 3 was formed by rolling two insulating sheets into a cylindrical form instead of using the stationary element having a flat surface form shown in Example 1. Electrodes formed on the stationary element are transparent because ITO particles are formed by a gravure printing method. The movable element was printed with pictures and letters, and a resistance layer was coated on it. Each of the movable elements was placed on each of the stationary elements. Two driving voltage control sections were provided each comprising a high voltage power source of direct current 10, a high voltage switching portion 11 and a driving control portion 12, and voltages from the control sections were independently applied to the electrodes 3 of the respective stationary elements to thereby drive the stationary elements independently. Since the electrostatic actuator is so formed that the two movable elements on which pictures, letters and so on are printed are moved independently, with respect to speed and the direction of rotation, on the front and back surfaces of the stationary elements 3, it can be used as a display which has not been proposed in the past.

In FIG. 6, the two line systems of driving voltage control section are used. However, the same effect is obtainable even by a single line system or a multi-line system.

Further, since the electrodes of the stationary elements are transparent, a multi-layered structure is possible by inserting spacers between the stationary elements.

COMPARATIVE EXAMPLE

As the high voltage power source of direct current for an electrostatic actuator, a piezoelectric transformer utilizing the resonance of a piezoelectric element is known and was used instead of the power source $L_O$ for purposes of comparison.

Figure 8:
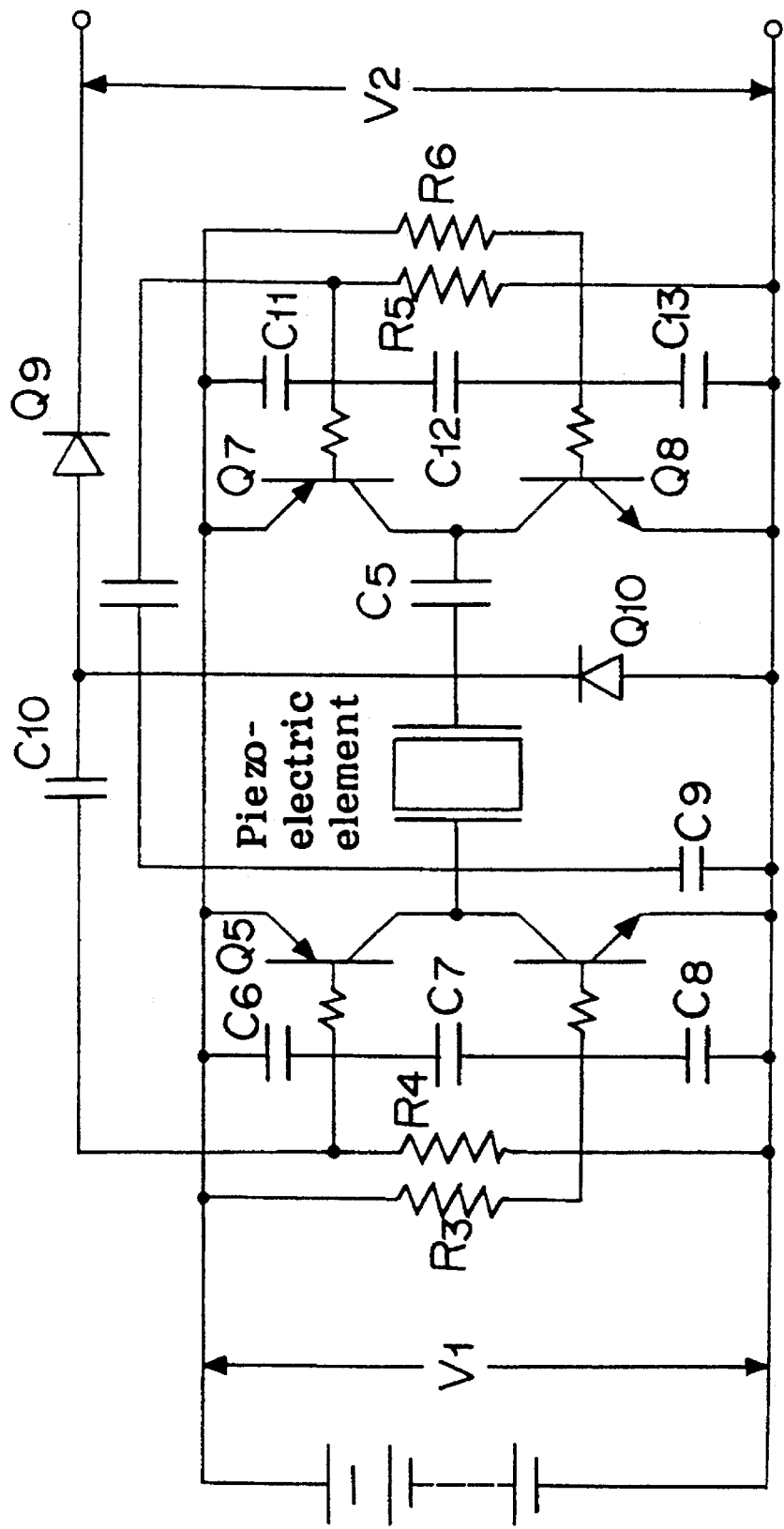
FIG. 8 is a schematic view of a high voltage power source of direct current for an electrostatic actuator manufactured in accordance with Comparative Example.

In accordance with the circuit diagram shown in FIG. 8, a high voltage power source of direct current using a cylindrical piezoelectric element was formed. The voltage raising ratio of the transformer is determined by the physical properties and the resonance frequency of the piezoelectric element. The main specifications of the circuit are as follows. The driving control portion and the switching portion were manufactured in the same manner as in Example 1.

Size of piezoelectric element: 15 mm (diameter)×15 mm (height)
Piezoelectric constant ($d_{33}$): 463×10$^{-12}$ m/V
Piezoelectric strain constant (Qm): 1,600
Resonance frequency: 110 kHz In the same manner as in Example 1, the electrostatic actuator was driven by an input voltage of DC4.5 V and 20 Hz (8 mm/s). As a result, the movable element could not be moved. This is likely that a sufficient output voltage is not obtained because the capacity of the output current of the high voltage power source of direct current is small as about 0.01 mA or lower.

Obviously, numerous modifications and variations of the present invention are possible in light of the above teachings. It is therefore to be understood that within the scope of the appended claims, the invention may be practiced otherwise than as specifically described herein.

What is claimed is:

1. An electrostatic actuator which comprises:
   a first member having a plurality of driving electrodes arranged in a predetermined direction and with predetermined spaced in an isolated state on an insulating supporter,
   a second member, disposed in contact with the first member, which is provided with means for supplying positive and negative electric charges to an insulating sheet, and
   a driving voltage control section to apply to the electrodes voltages which cause a change of a relative position of the first and second members by Coulomb's force of static electricity between the first and second members, which is produced by switching the voltages to the driving electrodes, wherein the driving voltage control section comprises a high voltage power source of direct current, a high voltage switching portion and a driving control portion; the high voltage power source of direct current comprising a transformer to raise a voltage of a high frequency signal and a rectifier to rectify an output of the transformer to obtain high positive and negative voltages of direct current.

2. The electrostatic actuator according to claim 1, wherein the high voltage power source of direct current comprises an inverter portion for switching a low voltage direct current into a high frequency current, a transformer portion including said transformer to raise the voltage of the high frequency current, and a rectifying circuit portion including said rectifier for forming high positive and negative voltages of direct current by rectifying the current.

3. The electrostatic actuator according to claim 2, wherein the oscillating frequency of the inverter portion is 10 kHz–1 MHz.

4. The electrostatic actuator according to claim 2, wherein the rectifying circuit portion has a smoothing capacitor and a diode.

5. The electrostatic actuator according to claim 2, wherein the voltage raising ratio in the transformer portion is 5 to 500 times.

6. The electrostatic actuator according to claim 1, wherein the high voltage switching portion is a small power element.

7. The electrostatic actuator according to claim 1, wherein the first and second members are made of a film-like material.

8. The electrostatic actuator according to claim 1, wherein the first member is transparent.

9. The electrostatic actuator according to claim 1, wherein the surface resistivity of the second member is $10^{11}$ to $10^{15}$ Ω/□.

10. The electrostatic actuator according to claim 1, wherein the insulating sheet is provided with a resistance layer as means for supplying positive and negative electric charges to the insulating sheet.

11. The electrostatic actuator according to claim 1, wherein a plurality of strip electrodes are disposed on the insulating sheet as means for supplying positive and negative electric charges to the insulating sheet.

12. The electrostatic actuator according to claim 1, wherein a lubrication layer is disposed at least one of the contacting surfaces of the first and second members.

13. The electrostatic actuator according to claim 1, wherein projections of a height of 2–50 μm are formed with a density of 1–100,000 number/cm$^2$ in at least one of the contacting surfaces of the first and second members.

14. An electrostatic actuator which comprises:
   a first member having a plurality of driving electrodes arranged in a predetermined direction and with predetermined spaces in an isolated state on an insulating supporter,
   a second member, disposed in contact with the first member, which is provided with means for supplying positive and negative electric charges to an insulating sheet, and
   a driving voltage control section to apply to the driving electrodes voltages which cause a change of the relative position of the first and second members by a Coulomb's force of static electricity between the first and second members, which is produced by switching the voltages to the driving electrodes, wherein the driving voltage control section comprises a high voltage power source of direct current and a driving control portion, and a high voltage pattern of direct current is produced by passing driving control signals from the driving control portion through at least one voltage-raising-rectifying circuit in the high voltage power source of direct current.

15. The electrostatic actuator according to claim 14, wherein the first and second members are made of a film-like material.

16. The electrostatic actuator according to claim 14, wherein the first member is transparent.

17. The electrostatic actuator according to claim 14, wherein the surface resistivity of the second member is $10^{11}$ to $10^{15}$ Ω/□.

18. The electrostatic actuator according to claim 14, wherein the insulating sheet is provided with a resistance layer as means for supplying positive and negative electric charges to the insulating sheet.

19. The electrostatic actuator according to claim 14, wherein a plurality of strip electrodes are disposed on the insulating sheet as means for supplying positive and negative electric charges to the insulating sheet.

20. The electrostatic actuator according to claim 14, wherein a lubrication layer is disposed at least one of the contacting surfaces of the first and second members.

21. The electrostatic actuator according to claim 14, wherein projections of a height of 2–50 μm are formed with a density of 1–100,000 number/cm$^2$ in at least one of the contacting surfaces of the first and second members.

* * * * *